United States Patent

Jorgensen et al.

[11] Patent Number: 6,113,862
[45] Date of Patent: *Sep. 5, 2000

[54] FLUIDIZED BED POLYMERIZATION REACTOR WITH MULTIPLE FLUIDIZATION GRIDS

[75] Inventors: Robert James Jorgensen, Somerset; Steven Paul Sawin, Bridgewater, both of N.J.

[73] Assignee: Union Carbide Chemicals & Plastics Technology Corporation, Danbury, Conn.

[ * ] Notice: This patent is subject to a terminal disclaimer.

[21] Appl. No.: 08/892,019

[22] Filed: Jul. 14, 1997

Related U.S. Application Data

[63] Continuation-in-part of application No. 08/842,395, Apr. 23, 1997.

[51] Int. Cl.[7] .................................. B01J 8/18; B01J 8/28; C08F 2/34; C08F 10/00
[52] U.S. Cl. .......................... 422/142; 422/139; 422/140; 422/143; 422/146; 422/147; 526/65; 526/68; 526/88
[58] Field of Search .................................. 422/131, 134, 422/139–141, 142, 143–147; 526/65, 68, 88

[56] References Cited

U.S. PATENT DOCUMENTS

| | | | |
|---|---|---|---|
| 2,254,070 | 8/1941 | Jacocks | 165/278 |
| 3,023,203 | 2/1962 | Dye | 526/68 |
| 3,300,457 | 1/1967 | Schmid et al. | 526/88 |
| 3,931,134 | 1/1976 | Hartmann et al. | 526/65 |
| 3,957,448 | 5/1976 | Shepard et al. | 422/135 |
| 4,048,412 | 9/1977 | Caumartin et al. | 526/66 |
| 4,349,648 | 9/1982 | Jorgensen et al. | 526/124.6 |
| 4,390,669 | 6/1983 | Morita et al. | 526/65 |
| 4,482,687 | 11/1984 | Noshay et al. | 526/126 |
| 4,588,790 | 5/1986 | Jenkins, III et al. | 526/70 |
| 4,933,149 | 6/1990 | Rhee et al. | 422/131 |
| 5,235,009 | 8/1993 | Hogan | 526/65 |
| 5,290,745 | 3/1994 | Jorgensen et al. | 502/19 |
| 5,317,036 | 5/1994 | Brady, III et al. | 523/223 |
| 5,378,434 | 1/1995 | Staffin et al. | 422/141 |

FOREIGN PATENT DOCUMENTS

| | | |
|---|---|---|
| 0173261 | 8/1985 | European Pat. Off. . |
| 0369640 | 11/1988 | European Pat. Off. . |
| 0509618 | 11/1989 | European Pat. Off. . |
| 0 553 809 A1 | 8/1993 | European Pat. Off. . |
| WO 97/02887 | 3/1997 | WIPO . |

OTHER PUBLICATIONS

Japanese Patent Abstract Publication No. 60245603, Publication Date: May 12, 1985, Idemitsu Petrochem Co. Ltd.

*Primary Examiner*—Hien Tran
*Attorney, Agent, or Firm*—P. W. Leuzzi; P. A. Doody

[57] ABSTRACT

The invention teaches a novel design for a fluidized bed polymerization reactor which utilizes a primary fluidization grid to provide mixing and fluidization of the polymer and at least one secondary distribution plate located above the first distribution plate to promote segregation of polymer particles by size, the larger particles falling into the lower fluidization zone and the smaller particles being entrained up from the primary fluidization grid and through the secondary distribution grid into an upper reaction zone.

10 Claims, 2 Drawing Sheets

FLUIDIZED BED POLYMERIZATION REACTOR WITH MULTIPLE FLUIDIZATION GRIDS

This continuation-in-part application claims priority to co-pending U.S. patent application Ser. No. 08/842,395 (D-17691), filed Apr. 23, 1997.

BACKGROUND OF THE INVENTION

The design of fluidization grids for fluidized polymerization reactors is known in the art and disclosed in such patents as U.S. Pat. No. 4,933,149 and EP Patent 173,261. Mechanically swept distribution grids are described in U.S. Pat. No. 3,254,070 to Roulen. A process with no distributor plate is described in U.S. Pat. No. 3,023,203 to Dye which allows the largest particles to fall through and melt in an extrusion zone.

U.S. Pat. No. 3,300,457 to Schmid et al. discloses an elaborately designed stirrer which extends from the base of the reactor to the top of a constant diameter reaction zone, this system also does not include a distribution grid to disperse the fluidizing gas. Moreover, the upper bound on suitable fluidization velocities of 0.5 ft/sec (0.18 m/sec) is much lower than the desirable velocity of utility in a commercial fluidized bed polymerization.

Reactors with multiple individual reaction zones are known. For example, U.S. Pat. No. 4,390,669 teaches staged type reactors, however an additional suspension zone stage between the reactors in a hydrocarbon diluent is required for the improvements described. These reactors generally require, however, multiple reaction systems to attain the desired product properties and none teach how to achieve controlled residence time within one reactor.

U.S. Pat. Nos. 3,957,448 and 5,378,434 disclose "staged" reactors contained within a separate pressure vessel, however both of these require use of a horizontal, mechanically agitated bed for operation.

SUMMARY OF THE INVENTION

The invention teaches a fluidized bed polymerization reactor which utilizes a primary fluidization grid (or distribution plate) to provide initial mixing and fluidization of the granular polymer product and at least one secondary distribution plate located above the first distribution plate to promote segregation of polymer particles by size, the larger particles falling into the lower fluidization zone and the smaller particles being entrained up from the primary fluidization grid and through secondary distribution grids into other reaction zones. The secondary plate(s) provides increased uniformity of the residence time of the exiting polymer particles through utilization of their fluidization characteristics.

The secondary distribution grid also can act as an additional distribution means for liquid condensate flow allowing for higher liquid condensate flow in the reaction system and higher maximum production rates. The lower portion of the bed can exist in a three phase mode with liquid coexisting with gas and polymer, i.e., the temperature in this zone is between dew point and bubble point at the bottom of the secondary fluidization grid.

DETAILED DESCRIPTION OF THE INVENTION

Figure 1:
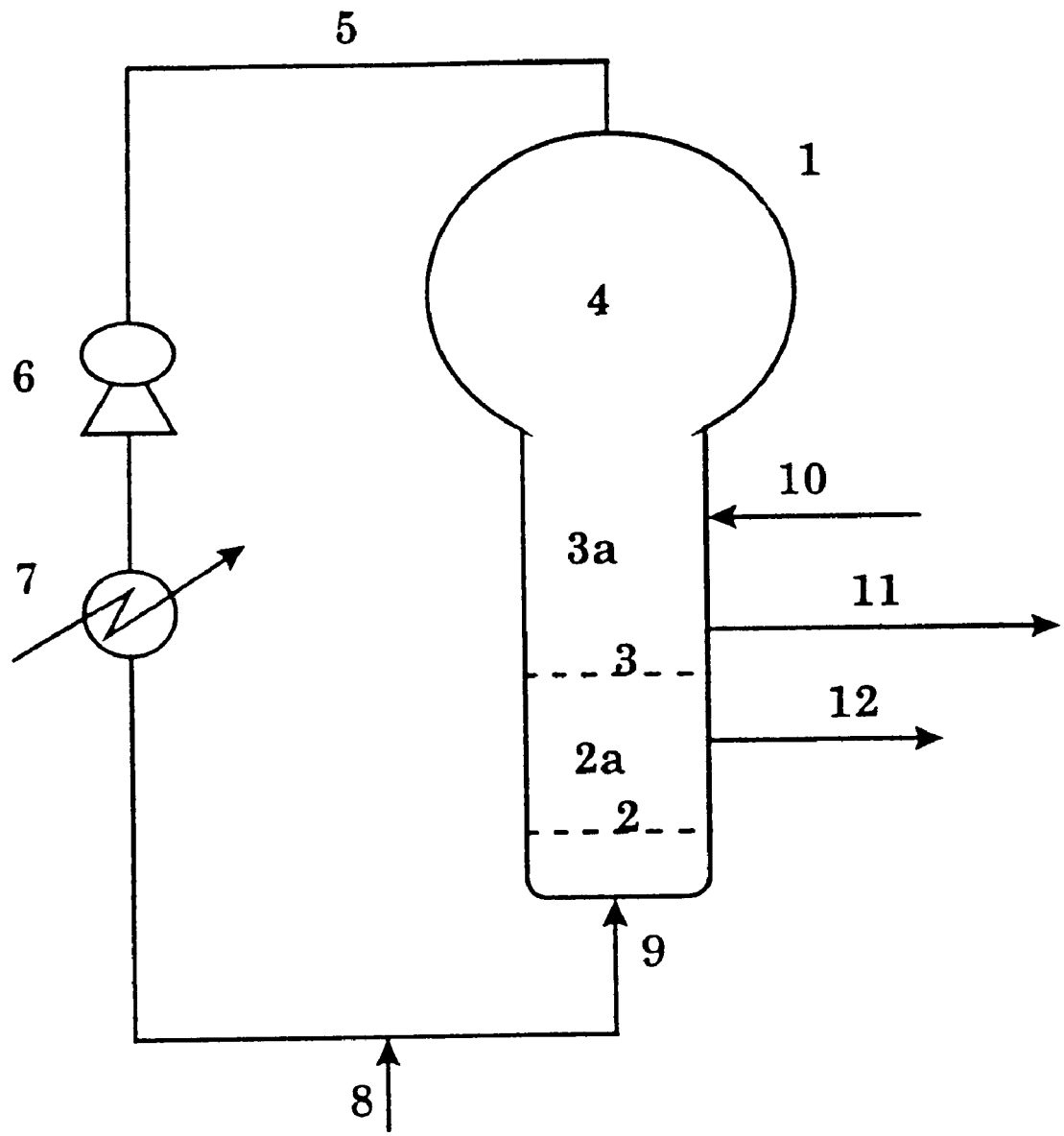
FIG. 1 is an exemplary fluidized bed reactor system.

Some of the advantages of this reactor configuration are: (a) capability for increased catalyst productivity by only discharging the largest particles from the reactor, of particular value when catalyst systems with low decay rates are used; (b) capability for a more uniform particle size final product due to partial elimination of fines in the product discharged from the reactor; (c) provide a more uniform residence time; (d) capability to use larger condensing flows since the larger particles in the bottom of the reaction zone will be less likely to form sludges/muds when in contact with large volumes of condensate which enter the bottom zone of the reactor (i.e. typically the bottom 12–18 inches (0.3–0.5 m) of the fluidized bed) which can foul the bottom of the reactor; (e) capability to have two different reaction zones in the same reactor by utilizing high condensate flows, such that a three-phase reaction zone (gas, liquid and solid) exists below the secondary distribution grid and above the primary distribution grid which results in improved catalyst activity due to enhanced localized cooling and potential opportunity to modify molecular weight distributions by maintaining different reaction fugacity in the two reaction zones; (f) improved polypropylene impact copolymers due to a more homogeneous distribution of rubber in particles exiting the reactor due to a more uniform residence time; (g) improvement in carbon black utilization in ethylene propylene rubber (EPR) due to an improvement in particle size distribution; and (h) production of polymer particles with a narrower residence time distribution than available from conventional single reactor systems with a single fluidization grid which is of particular utility in polybutadiene and polyisoprene rubber polymerizations where material properties such as molecular weight and molecular weight distribution can be a function of residence time.

The present system allows particles of larger size to segregate into the bottom section of the reactor for product discharge, resulting in more efficient use of catalyst (i.e., higher residence time particles will tend to be larger and end up in the bottom zone of the reaction system) and to produce a granular product of more uniform size to allow for more uniform mixing in compounding extruders while maintaining mixing in all reaction zones due to the use of multiple distributor plates.

The reactor configuration is particularly useful in multiple reactor configurations to increase the probability that polymer entering subsequent reactor is of more uniform size and age distribution, e.g., in two reactor impact copolymer polypropylene to minimize the amount of "short pass catalyst" (i.e. catalyst particles which have not produced significant amounts of homopolymer—leading to very large rubber particles in the second reactor and gels or fisheyes in the final product, reducing impact strength) and in multiple reactor systems used to produce polymers with broad molecular weight distributions. Exemplary reactor systems are described in U.S. Pat. Nos. 5,047,468 and 5,258,464, which are incorporated herein in relevant part. Another use is with solution feed metallocene catalysts to allow the largest particles to disengage from the upper bed and fresh catalyst particles to grow in an area of smaller average polymer particle size, minimizing the effect of layering of liquid catalyst onto already polymerized particles. Yet another utility is in the second stage of the staged reactor system, to effectively increase the "number" of stages in the reaction system. In that case, the feed from the first reactor should be directed to an area above the second fluidization grid to increase the average residence time and narrow the residence time distribution of the catalyst rich, smaller particles.

Reaction Process

The invention can be carried out in a single reactor or multiple gas phase, fluidized bed reactors (two or more reactors in series), though a single reactor system is where the benefits of the present invention may be most obvious. In addition to well known conventional gas phase polymerizations processes, "condensed mode", including the so-called "induced condensed mode", and "liquid monomer" operation of a gas phase polymerization can be employed. The invention may be particularly useful in application of the condensed mode wherein greater than 20% of the recycle fluids are condensed into liquid state due to the significant reduction in fine particles in the bottom of the polymerizing bed.

With high condensate flows (typically >30 wt %), it is possible to develop a three-phase region below the secondary grid. In such a case, the secondary grid acts as both a gas distribution grid and a liquid redistribution grid, improving liquid dispersion.

A conventional fluidized bed process for producing polymers is practiced by passing a gaseous stream containing one or more monomers continuously through a fluidized bed reactor under reactive conditions in the presence of a polymerization catalyst. Product is withdrawn from the reactor. A gaseous stream of unreacted monomer is withdrawn from the reactor continuously and recycled into the reactor along with make-up monomer added to the recycle stream. Condensed mode polymerizations are disclosed in U.S. Pat. Nos. 4,543,399; 4,588,790; 5,352,749; and 5,462,999. In these polymerizations a recycle stream, or a portion thereof, can be cooled to a temperature below the dew point in a fluidized bed polymerization process, resulting in condensing all or a portion of the recycle stream. The recycle stream is returned to the reactor. Condensable fluids include saturated or unsaturated hydrocarbons. In addition condensable fluids, inert to the polymerization can be introduced to "induce" condensing mode operation. Examples of suitable condensable fluids may be selected from liquid saturated linear and branched hydrocarbons containing 2 to 8 carbon atoms. Condensable fluids may also include polymerizable condensable comonomers such as olefins, alpha-olefins, diolefins, diolefins containing at least one alpha olefin, and mixtures thereof.

Liquid monomer polymerization mode is disclosed, in U.S. Pat. No. 5,453,471, U.S. Pat. No. 5,834,571, PCT 95/09826 (US) and PCT 95/09827 (US). When operating in the liquid monomer mode, liquid can be present throughout the entire polymer bed provided that the liquid monomer present in the bed is adsorbed on or absorbed in solid particulate matter present in the bed, such as polymer being produced or fluidization aids (e.g., carbon black) present in the bed, so long as there is no substantial amount of free liquid monomer present more than a short distance above the point of entry into the polymerization zone. The process comprises continuously introducing a stream of one or more monomers and optionally one or more inert gases or liquids into the polymerization zone; continuously or intermittently introducing a polymerization catalyst into the polymerization zone; continuously or intermittently withdrawing polymer product from the polymerization zone; and continuously withdrawing unreacted gases from the zone; compressing and cooling the gases while maintaining the temperature within the zone below the dew point of at least one monomer present in the zone.

The superficial gas velocity is typically greater than about 0.8 ft/sec (0.3 m/sec) and generally less than 3.5 ft/sec (1.2 m/sec); however the appropriate superficial gas velocity is a function of the density of the gas (i.e., higher pressures require lower recycle gas velocities for efficient mixing and good heat removal due to higher gas momentum), the amount of condensable liquid carried in the gas stream and the desired average particle size of the polymer produced. The superficial gas velocity ("SGV") in the reactor should be, at a minimum, sufficient to mix the particles in the primary reaction zone above the secondary grid without excessive particle carryover. Depending on the density of the fluidizing gas and the size and density of the particles being fluidized, this value can range from about 0.8 ft/sec (about 0.3 m/sec) to about 1.5 ft/sec (about 0.6 m/sec). Additional gas flow serves to increase mixing as well as to provide for greater heat transfer which allows for higher polymerization rates. Thus, the superficial gas velocity utilized is typically higher than the minimum required. Superficial gas velocities useful in this invention range from 0.8 ft/sec (about 0.3 m/sec) to as high as 3.5 ft/sec (about 1.2 m/sec), again depending on the density of the fluidizing gas and the particle size of the fluidized polymer.

Reactor Design

A reactor of the present invention has within a reaction vessel:

(1) a primary distribution plate (or fluidization grid) which obstructs ≧about 75%, and preferably about ≧90% of the area available for flow (with appropriate design to prevent backflow and pluggage);

(2) at least one secondary fluidization grid located above the primary fluidization grid which obstructs ≦about 75% (and preferably ≦50%) of the area for flow and has openings for downflow of solids sufficiently large such that particles of larger size generally at least about 250 μm and preferably above 500 μm will readily segregate into the lower section; and (3) a transport disengaging section (or velocity reducing section) which allows the superficial velocity of fluidizing gas to decrease so that fines fall back into the bed.

In a continuous system, the reactor should also have (4) catalyst feeder(s) to either of the two (or more) polymerization zones, preferentially into the upper section of the reactor, above the first (or only) secondary fluidization grid;

(5) a product discharge system for the lower section of the reactor, preferentially located near the base of the reactor, generally within about 6 to 12 inches (0.15–0.3 meters) from the top of the primary fluidization grid;

(6) a product discharge system for the upper section of the reactor, preferentially within 6 to 12 inches (0.15–0.3 meters) from the top of the secondary fluidization grid; to allow this area to be swept of sheets or chunks; and (7) a recycle line having a condenser and heat exchanger and preferably, monomer, comonomer(s) and, if used, induced condensing agent feed line(s).

Generally, in operation there is a fluidized bed containing the growing polymer particles and catalyst. In the instant system, there are, in effect, two such beds (or reaction zones). A primary reaction zone (or bed) above the second fluidization grid and a secondary reaction zone (or bed) between the two grids. There may be additional zones if additional grids are used. Preferably, if additional fluidizing grids are used, the cross sectional area of the fluidized bed that is obstructed by the additional grids will increase continually as the grids are installed further vertically upward within the reactor; i.e., each grid will be designed with smaller (preferred) openings or fewer (less preferred) openings than the previous grid. This will continue to allow for downflow of solids, ensuring that particles of larger size preferentially segregate into the lower section.

The elevation of the secondary grid should be sufficiently high both to allow segregation of larger particles into the lower fluidization zone to occur, while at the same time sufficiently low such that very large bubbles do not form in the gaseous phase of the reactor. It is preferable that the fluidization regime below the secondary fluidization grid be characterized by a large emulsion phase (i.e. gas and solid mixed together such that a relatively homogenous "fluid" mixture results) with a relatively small bubble phase. This kind of fluidization regime favors relatively small bubbles (in comparison to the diameter of the reactor). When condensate flow is sufficiently high, a three-phase system will form in which liquid is present throughout the bed in the lower fluidization zone and in which liquid droplets are also present within the emulsion phase.

Although larger bubbles can be tolerated, very large bubbles could result in "surging" flow through the secondary grid resulting in defluidization just above the grid and consequently flow of small particles downward through the grid. Typical commercial fluidized bed polymerization reactors have a diameter of 8 to 16 feet (2.4–5 m) and operate with an L/D ratio (length or height of fluidized bed not including the velocity reduction section) of about 3 to 10, preferably about 4–8. The distance of the secondary grid above the primary grid is mainly a function of the diameter of the reactor (D). The larger D, the lower the second distribution grid should be. Typically, the secondary fluidization grid is located between about 0.5 times D above the first fluidization grid to about two times D above the first fluidization grid. Very large diameter reactors will require the secondary grid to be closer to the 0.5 D ratio; smaller diameter reactors will be in the 1–2 D range. Preferably the secondary distribution grid should be located between about 0.5 and about 2.0 D, more preferably about 0.75 to about 1.5 D above the primary distribution grid. Any additional secondary fluidization grids would follow such spacing requirements in relation to the fluidization grid below it.

The fluidization grids can be designed such that the fraction of the grid which is open can be adjusted, preferably in line, to help control the size of the particles which collect below the grid. With multiple grids, said sizing may be in a gradient of opening size, i.e. with the uppermost grid being smallest and as one goes down the reactor, the size would increase. Temperature measurements should be made on both sides of the secondary grid, but the control should take place using measurements on the same side of the grid as the primary catalyst feed.

The primary distribution grid is designed such that the pressure drop across the grid is at least 15% of that of the total pressure drop across the bed; i.e., as the pressure differential measured from immediately above the primary distribution grid to the top of the fluidized bed (this measurement is typically taken in the expanded or velocity reduction section of the reactor as described above) and most preferably greater than about 30% of the bed pressure drop. It should be noted that the preferred value will change somewhat, depending on the absolute number of secondary fluidization grids installed within the reactor; i.e., each secondary grid will contribute further to the total pressure drop across the entire fluidized bed polymerization reactor.

The primary distribution grid is typically a plate with a plurality of holes, preferably each of which will be covered with a flow deflector to sweep and mix solids on the grid. Preferred holes sizes are from about ¼ inch (0.65 cm) to as large as about 1.5 inch (3.8 cm). A preferred grid has all holes the same size and flow deflectors arranged such that adjacent flow deflectors will direct flow to impinge on another flow deflector and so on. Additional smaller holes may be provided around the circumference of the distribution grid to increase gas flow upwardly around the circumferential wall of the reactor.

Figure 2:
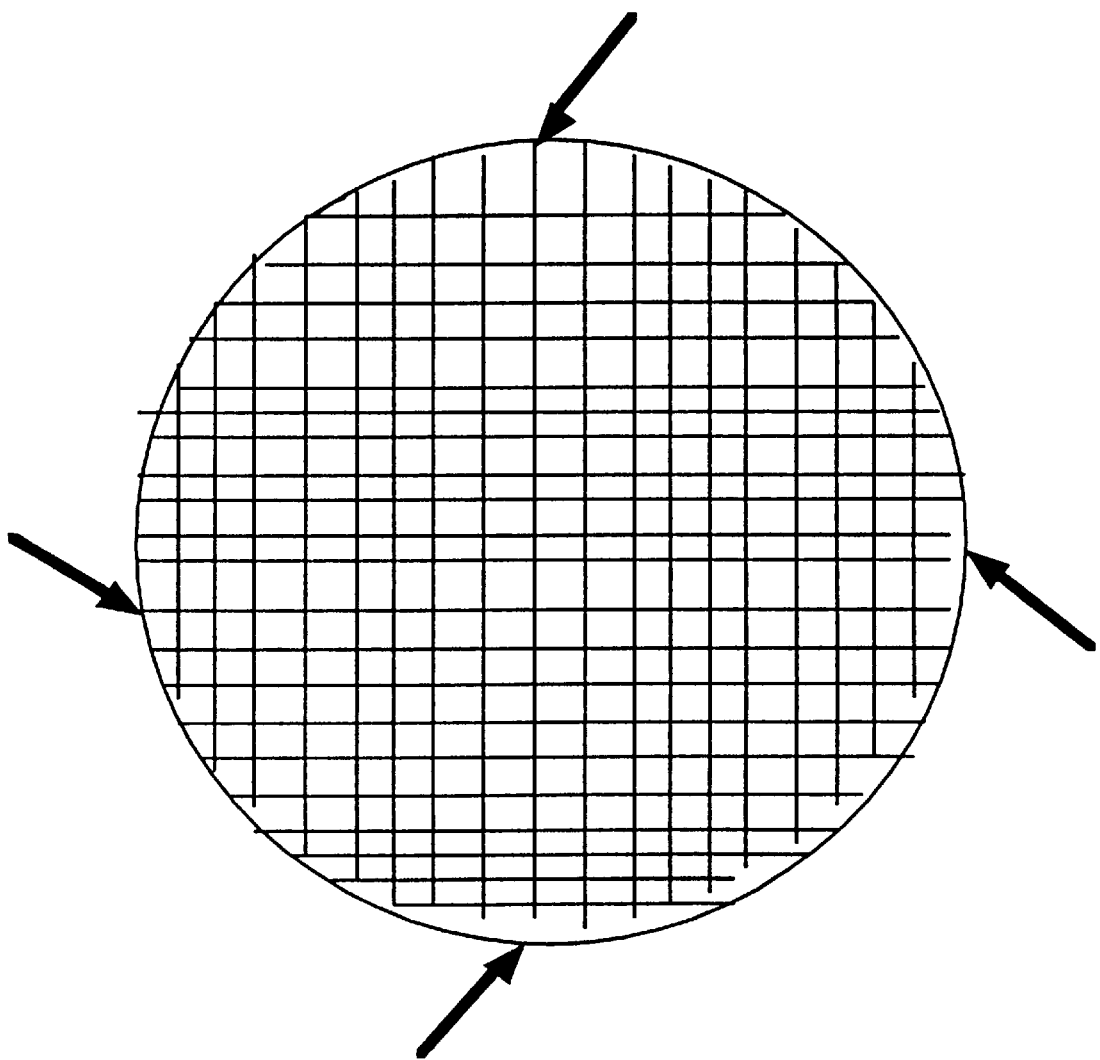
FIG. 2 is an exemplary fluidization grid.

The secondary distribution grids preferably will be mesh-like as depicted in FIG. 2 and will have a significantly lower pressure drop than the primary distribution grid. One configuration of the second fluidization grid is shown in FIG. 2 with a plurality of tangential nozzles for optional split recycle flow. The second fluidization grid may consist of a grid with openings (typically >1 inch) or other configuration which satisfies the criteria given in the body of the specification. Typical industrial metal mesh grids can be used (i.e. materials similar to metal grates with ½ (1 cm) to 2 inch (5 cm) openings or custom made grids can be used, depending on the desired segregation factor and the needed mechanical strength of the secondary fluidization grid. Normally, these grids would be produced of steel or higher alloy steels, however certain plastic materials would also be usable. The substantially lower pressure drop of these grids is accomplished by having the secondary distribution grids be primarily open; obstructing less than about 75% of the area available for flow, preferably less than about 50% of the area and most preferably less than about 25% to 40% of the area. The size of the holes in this grid are such that larger particles and some small agglomerates that are inevitably made in a fluidized bed polymerization will fall through the openings and into the secondary reaction zone. The secondary distribution grid may be a grid, pipe or other suitable materials with sufficient mechanical strength to withstand the turbulent motions within the fluidized bed reactor.

Feed Systems and Withdrawal

In one embodiment of the invention, all of the recycle gas is directed into the bottom of the reactor through the primary distribution grid. This is the "traditional" method of gas recirculation, useful in both dry and condensing mode operation. Optionally, recycle gas could be split and a side stream introduced into the reactor above the second fluidization grid, preferably tangentially in multiple locations to increase the superficial gas velocity there in comparison to the bottom of the reactor, allowing suspension of the finer particles while still allowing the larger particles to settle into the secondary reaction zone. Optionally, condensed liquids from the recycle line could be separated out and reintroduced into the reactor at either the primary or secondary reaction zones, depending on the particular kinetics of the polymerization reaction and the desired amount of condensate flow in the secondary reaction zone.

FIG. 2 gives a detail of the manner in which this secondary distribution would occur. Preferably, the additional flow is tangential to the reactor wall to improve swirl flow around the circumference of the reactor. Four nozzles are pictured, but more than four are feasible. The only requirement is that the additional flow be distributed evenly along the circumference of the reactor at the level of addition.

In another embodiment of the invention, additional conduits for flow of recycle gas into the primary reaction zone are supplied such that the recycle gas flow is split, utilizing the pressure differential cause by the primary distribution grid to provide driving force for the flow into the upper portion of the reactor. Up to 50% of the gas flow may be diverted from the base of the reactor into the primary reaction zone. Preferentially, the additional flow is supplied at a plurality of openings evenly spaced along the circumference of the reactor and most preferentially located such that the flow is tangential to the reactor wall. This effectively increases the driving force to suspend the larger particles within the primary reaction zone, allowing only the largest particles to fall into the secondary reaction zone for eventual product recovery.

In yet another embodiment of the invention, the entire recycle gas may be passed through a cyclone separator, the higher pressure stream being directed through the bottom of the reactor into the secondary reaction zone through the primary distribution grid and the lower pressure stream, which is enriched in entrained liquid is sent to the secondary recycle flow nozzles, where the polymerization rate is the highest, resulting in improved cooling and higher polymerization rate capability. Optionally, this secondary flow may be passed through another compressor to increase the velocity of the secondary gas entering the primary reaction zone; however, the difference in pressures achieved due to design in the primary distribution grid renders this secondary compressor optional (i.e., the pressure drop across the cyclone separator is less than the pressure drop across the primary distribution grid).

Product preferably is removed from the secondary reaction zone and consists of the larger particles of higher average residence time, and hence higher productivity. The primary function of the product discharge system above the secondary distribution grid is to remove agglomerates which might form that are larger than the openings in the secondary distribution grid, although this product discharge system could also be used to send polymer to a separate reaction system for further polymerization. A product discharge system as defined in EP Patent No. 71430 is especially preferred, however other methods of removal may be used. In particular, the product removed from this reaction zone may be sent to further reactors for additional polymerization using other monomers or reaction conditions. If the additional reactors also are equipped with a secondary distribution grid as in the instant invention, then the product preferably would be added above the secondary grid.

A variety of methods can be used to recover the product and recycle reactant gases which exit the reactor with the polymer product. Exemplary is EP Patent No. 71,430. Other methods may also be used, since the exact method of product recover is not critical to the efficacy of this invention.

Methods for removal of product from above the secondary distribution grid may also be part of reactor system. In this case, a preferred system has a pressure let down tank of equivalent pressure rating of the reactor and optionally of a second purging tank. Since this system will primarily be used to remove larger agglomerates, means for grinding chunks, sheets and other agglomerates as they exit from either tank are preferable. Product may also be removed from the primary zone and sent to other reactors in a multi-reaction system.

Catalyst and (optionally) cocatalyst feed mechanisms also may be part of the reactor system. Catalyst and/or cocatalyst feed (if needed) may be at a variety of points, ranging from into the recycle gas to the polymerizing bed, in either the primary reaction zone (i.e. above the secondary grid) or in the secondary reaction zone (below the secondary grid). If added separately, addition to either the recycle gas flow or directly into the primary reaction zone is preferred.

FIG. 1 depicts a preferred embodiment of the invention, with a reaction vessel 1, a primary fluidization grid 2, a secondary reaction zone 2a, a secondary fluidization grid 3, a primary reaction zone 3a, a velocity reduction section 4, a recycle line 5, a compressor 6, a heat exchanger 7, a monomer (and optionally comonomer(s), induced condensing agent, etc.) make-up line 8, a recycle feed line 9, a catalyst feed line 10 and two product withdrawal systems 11 and 12. The secondary distribution grid 3 generally is located approximately 0.75 D above the primary distribution grid 2. A catalyst feeding line 10 is provided above the secondary distribution grid 3. A product discharge system is provided in both reaction zones of the reactor 1. The primary product discharge system is located below the secondary distribution grid and above the primary grid. A plurality of both discharge systems may be used. Also in FIG. 2, a plurality of secondary recycle gas distribution nozzles are shown.

Catalyst

The catalyst may be fed as a solid, slurry or solution. Examples of suitable catalysts include:

A. Ziegler-Natta catalysts, including titanium based catalysts such as those described in U.S. Pat. Nos. 4,376,062 and 4,379,758. Ziegler-Natta catalysts are typically are magnesium/titanium/electron donor complexes used in conjunction with an organoaluminum cocatalyst.

B. Chromium based catalysts such as those described in U.S. Pat. Nos. 3,709,853; 3,709,954; and 4,077,904.

C. Vanadium based catalysts such as vanadium oxychloride and vanadium acetylacetonate, such as described in U.S. Pat. No. 5,317,036.

D. Metallocene catalysts, such as disclosed in U.S. Pat. No. 5,317,036.

E. Cationic forms of metal halides, such as aluminum trihalides.

F. Cobalt catalysts and mixtures thereof such as those described in U.S. Pat. Nos. 4,472,559 and 4,182,814.

G. Nickel catalysts and mixtures thereof such as those described in U.S. Pat. Nos. 4,155,880 and 4,102,817.

H. Rare Earth metal catalysts, i.e., those containing a metal having an atomic number in the Periodic Table of 57 to 103, such as compounds of cerium, lanthanum, praseodymium, gadolinium and neodymium.

Catalyst may be fed in an "unactivated" state, partially activated, preactivated or prepolymerized catalysts.

If the catalyst is fed as a solid, a continuous catalyst feed system which discretely meters in small quantities of catalyst to an inert carrier gas is preferred. If the catalyst is fed as a slurry, a heavy hydrocarbon fluid or mineral oil diluent is preferred and a positive displacement means of feed is preferred. The slurry may be carried into the reactor either with an inert gas, a cosolvent (isopentane or hexane are especially preferred), with a solution of cocatalyst (if required) or with monomer which is particularly preferred for polymerizations in which the catalyst finally is activated within the fluidized bed reactor. Alternatively, the catalyst may be fed in combinations of the foregoing.

Diluents for the solution form catalyst are materials such as isopentane, hexane, toluene and the like. Compounds which easily purge from the product are preferred, however due to solubility considerations, other solvents may be required.

Cocatalyst feed, when required, may be in solution or as neat material. If in solution, hydrocarbons such as hexane and isopentane are especially preferred due to ease in purging from the final polymer although other solvents such as toluene may be used. As mentioned previously, the cocatalyst, particularly when used as a solution, may be part of the carrier fluid for slurry or solution catalysts.

Polymers

Illustrative of the polymers which can be produced in accordance with the invention are the following: ethylene homopolymers and ethylene copolymers employing one or more $C_3$–$C_{12}$ alpha olefins; propylene homopolymers and propylene copolymers employing one or more $C_4$–$C_{12}$ alpha olefins; polypropylene impact copolymers; polyisoprene; polystyrene; polybutadiene; polymers of butadiene copolymerized with styrene; polymers of butadiene copolymerized with acrylonitrile; polymers of isobutylene copolymerized with isoprene; ethylene propylene rubbers and ethylene propylene diene rubbers where the diene includes ethylidene norbornene (ENB), octadiene, 5 methyl, 1,6-octadiene; polychloroprene, and the like.

We claim:

1. A gas-phase polymerization reactor comprising a housing having disposed therein cylindrical reaction zones of diameter D and a transport disengaging section having a diameter greater than D, said housing comprising:
   a. a primary fluidization grid disposed within said housing, the primary fluidization grid having means to provide mixing and fluidization of granular polymer particles;
   b. at least one secondary fluidization grid above the primary fluidization grid, the secondary fluidization grid having means to promote segregation of granular polymer particles and to allow polymer particles to fall through the at least one secondary fluidization grid;
   c. a primary reaction zone above the at least one secondary fluidization grid having diameter D, the primary reaction zone including a fluidized bed containing growing granular polymer particles and catalyst;
   d. a secondary reaction zone below the at least one secondary fluidization grid having diameter D, the secondary reaction zone including a fluidized bed containing growing granular polymer particles and catalyst;
   e. the transport disengaging section above the primary reaction zone, whereby the diameter of the transport disengaging section is greater than D; and
   f. a recycle system disposed outside the housing and containing a compressor and a heat exchanger, whereby the recycle system withdraws effluent from the housing, and returns at least a portion of the effluent to the housing,
      wherein the primary reaction zone and the secondary reaction zone are in fluid communication with one another to allow for downflow of solids and upflow of gases and liquids.

2. A reactor according to claim 1, wherein the secondary fluidization grid is about 0.5 to 2.0 D above the primary fluidization grid.

3. A reactor according to claim 2, wherein the primary fluidization grid has less than about 75 percent of open area.

4. A reactor according to claim 2, wherein the secondary fluidization grid has greater than about 75 percent of its area open for gas flow.

5. A reactor according to claim 1 additionally comprising (g) a catalyst feeder disposed above the primary fluidization grid; and (h) a product discharge system disposed adjacent the primary reaction zone and/or secondary reaction zone.

6. A polymerization process comprising:

feeding at least one olefin and a catalyst to the gas phase reactor according to claim 1, the reactor having primary and secondary reaction zones of a diameter D and length L;

passing the at least one olefin through the primary fluidization grid;

contacting the at least one olefin that passed through the primary fluidization grid with the catalyst and a bed of growing granular polymer particles in the secondary reaction zone;

passing unreacted olefin and any granular polymer particles entrained therein that passed through the secondary reaction zone through the at least one secondary fluidization grid;

contacting the unreacted olefin and any granular polymer particles entrained therein passed through the at least one secondary fluidization grid with catalyst and growing granular polymer particles in the primary reaction zone; and passing any unreacted olefin and granular polymer particles entrained therein that passed through the primary reaction zone into a transport disengaging zone having a diameter greater than D; and passing any unreacted olefin and granular polymer particles entrained therein remaining in the transport disengaging zone through the recycle system and back into the reactor via a recycle stream.

7. A process according to claim 6, wherein the secondary fluidization grid is about 0.5 to about 1.5 D above the primary fluidization grid.

8. A process according to claim 6, wherein the recycle stream is introduced below the primary fluidization grid.

9. A process according to claim 6, wherein the recycle stream is introduced at the secondary fluidization grid.

10. A process according to claim 6, wherein the recycle system has sufficient cooling capacity for the reactor to operate in condensing mode.

* * * * *